(No Model.)
G. DECKER.
FAUCET.
No. 544,403. Patented Aug. 13, 1895.
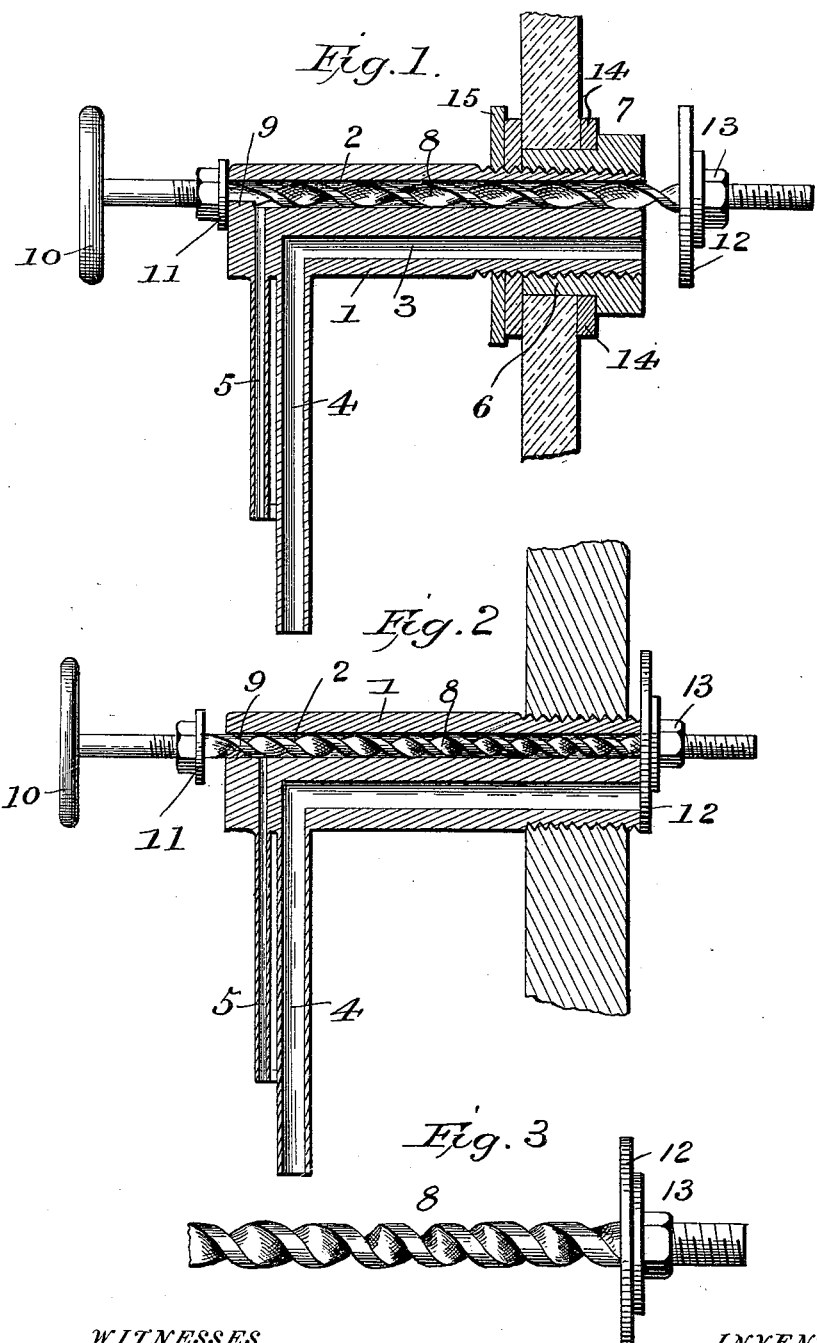
WITNESSES
F. L. Ourand
A. B. Smit
INVENTOR
George Decker
By H. B. Willson, Attorney

UNITED STATES PATENT OFFICE.

GEORGE DECKER, OF MONTGOMERY, PENNSYLVANIA.

FAUCET.

SPECIFICATION forming part of Letters Patent No. 544,403, dated August 13, 1895.

Application filed April 23, 1895. Serial No. 546,947. (No model.)

*To all whom it may concern:*

Be it known that I, GEORGE DECKER, a citizen of the United States, residing at Montgomery, in the county of Lycoming and State of Pennsylvania, have invented certain new and useful Improvements in Faucets; and I do declare the following to be a full, clear, and exact description of the invention, such as will enable others skilled in the art to which it appertains to make and use the same.

My invention relates to faucets, and more particularly to vent-faucets.

The object of the invention is to provide a faucet which shall be simple of construction, durable in use, and comparatively inexpensive of production.

With this object in view the invention consists in certain features of construction and combination of parts, which will be hereinafter fully described and claimed.

In the drawings, Figure 1 is a longitudinal vertical sectional view of my improved faucet, illustrating its application to a glass or earthenware vessel, showing the faucet closed. Fig. 2 is a similar view showing its application to a wooden vessel, showing the faucet open. Fig. 3 is a detail view of the spirally-grooved rod.

I will now proceed to describe my faucet constructed as applied to a glass or earthenware vessel.

1 denotes the body of the valve, having longitudinal passages 2 and 3, one above the other, the passage 2 being for the purpose of admitting air to the closed vessel and extends entirely through the body of the faucet, while the liquid-discharge passage ends short of the outer end of the body. Secured to the body 1 and communicating with the outlet-passage 3 is a discharge-tube 4, and secured to this discharge-tube and to the body 1 is an air-inlet tube 5, which communicates with the air-inlet passage 2 of the body. The tube 5 is shorter than the tube 4, for the purpose hereinafter set forth. The inner end of the body 1 is threaded to receive an interiorily screw-threaded collar 6, having a flanged inner end 7.

8 denotes a spirally-grooved rod, which extends through the air-inlet passage 2 and engages a stud or feather 9 in said passage, so that when the said rod is turned the stud or feather will cause the rod to move longitudinally in said passage. This rod is provided at its outer end with a handle 10 and a disk-valve 11, and at its inner end with a similar valve 12, held in place by the nut 13. In applying my invention to a glass or earthenware vessel I place around the collar, against its flange, a rubber or leather washer 14, and then insert the collar from within through a hole in the vessel. I then place a metal washer 15 around the screw-threaded portion of the body 1, and behind this place a leather or rubber washer 16. The body portion 1 is now screwed into the collar and the washers 14 and 16 clamped against the inner and outer walls of the vessel, effecting a water-tight joint, as well as preventing the cracking or breaking of the vessel.

In operation the lamp, bottle, or other vessel to be filled is placed under the faucet with the tubes projecting into the same. The handle 10 is now turned to move the rod inward, which carries with it the two disk-valves 12 and 11, the former to open the passages 2 and 3, and the latter to close the passage 2. The air will now be admitted through the tube 5 and passage 2 around the spirally-grooved rod to the vessel to which the faucet is secured, and the liquid be allowed to discharge through the passage 3 and the tube 4, due to the difference in the pressure of the hydrostatic column at the inner ends of the two passages. The liquid will now flow into the vessel placed beneath the faucet until its level reaches the lower end of the tube 5, thus shutting off the supply of air and automatically stopping the flow of liquid, and thereby preventing the overflow of the lamp or vessel being filled. Now, by turning the handle 10 in the opposite direction the spirally-grooved rod will be moved inward, bringing the valve at its inner end against the collar, thus positively shutting off the flow of liquid and allowing the lamp or bottle to be removed.

As shown in Fig. 2, the collar and its washers are dispensed with where the faucet is applied to a wooden vessel, the faucet being screwed into position therewith in the usual manner.

What I claim, and desire to secure by Letters Patent, is—

1. The combination with a body portion having an outlet passage and an air inlet passage, the latter of which extends through both ends of the body and is situated above the outlet passage and each passage being provided with a tube, of a rod carrying at each end a valve, said rod located in the air inlet passage and adapted to be reciprocated to open or close the inner ends of both passages and to open and close the outer end of said inlet passage.

2. The combination with a body portion having an outlet passage and an air inlet passage, the latter of which is situated above the outlet passage and extends through both ends of the body and is provided with a stud or feather, of a spirally grooved rod located in the last named passage and provided at each end with a disk valve for the purposes set forth, the groove of said rod engaging the said stud or feather.

3. The combination with a body portion having an outlet passage and an air inlet passage, the latter of which is situated above the outlet passage and extends through both ends of the body, tubes communicating with said passages, a rod located in the air inlet passage and provided with valves for the purposes described, a flanged collar screwed on the inner end of said body and washers 14, 15 and 16, substantially as described.

In testimony whereof I affix my signature in presence of two witnesses.

GEORGE DECKER.

Witnesses:
JOHN J. BURLEY,
S. M. RHONE.